United States Patent [19]
Reitz et al.

[11] 3,901,357
[45] Aug. 26, 1975

[54] AUTOMATIC SLACK ADJUSTER

[75] Inventors: Richard J. Reitz; John M. Nicolson; Guenter K. Herold, all of Elyria, Ohio

[73] Assignee: The Bendix Corporation, South Bend, Ind.

[22] Filed: July 1, 1974

[21] Appl. No.: 484,384

[52] U.S. Cl. .................. 188/79.5 K; 188/196 M
[51] Int. Cl.² ................................. F16D 65/56
[58] Field of Search ..... 188/79.5 K, 196 P, 196 BA, 188/196 M

[56] References Cited
UNITED STATES PATENTS
2,920,724  1/1960  Margetic et al. ............ 188/79.5 K X
3,351,163  11/1967  Sander et al. .............. 188/79.5 K X Primary Examiner—Duane A. Reger
Attorney, Agent, or Firm—Ken C. Decker; William N. Antonis

[57] ABSTRACT

An automatic slack adjuster for a cam-operated brake is disclosed. The adjustment mechanism includes a pair of torque-limiting clutch springs. One spring limits adjustment to a predetermined torque level so that large actuating forces generated during a brake application will not overload the adjustment mechanism. The other clutch spring insures that the adjuster will not "back off" after an adjustment is effected. The adjuster is designed so that manual adjustment may also be effected, either to adjust the brakes or to back the brakes off without disconnecting any part of the automatic adjuster mechanism.

12 Claims, 6 Drawing Figures

AUTOMATIC SLACK ADJUSTER

BACKGROUND OF THE INVENTION

Manual slack adjusters have been manufactured for cam-actuated brakes for many years. To assure that the clearance between the brake shoes and the drum of a cam-actuated brake is maintained at an optimum value at all times, it is very desirable to effect adjustment automatically so that the vehicle operator need not periodically manually adjust the brakes. However, it is also necessary to be able to easily effect a manual adjustment of the brakes at the time of vehicle manufacture and at times when the brakes require relining.

Another feature demanded of automatic slack adjuster mechanisms is that they be able to differentiate between large and small brake actuating forces and that they effect adjustment only when the forces are relatively small. Brake actuating forces are relatively small when the shoes are moving toward and away from the drum, and the brake actuating for forces increase substantially when the brake shoes are in contact with the drum. Since the relatively large brake actuating forces increase the frictional forces within the adjuster to a level which prevents operation of the device, it is necessary to limit adjustment to force levels below some predetermined level.

Finally, it is desirable from the manufacturing standpoint to design an automatic slack adjuster which incorporates as many parts of a conventional manual slack adjuster as is possible. The manual slack adjuster has been manufactured for a number of years and has been proven to be virtually trouble-free, and it is consequently desirable to retain as many features of the conventional manual slack adjuster as is possible, with the addition of a few parts to accomplish an automatic adjustment.

SUMMARY OF THE INVENTION

Therefore, an important object of our invention is to provide an automatic slack adjuster for a cam-actuated brake which is able to differentiate between relatively small brake application forces and higher brake application forces wherein operation of the adjustment mechanism is limited to force levels below a predetermined level.

Another important object of our invention is to provide an automatic slack adjuster wherein manual adjustment and back off of the brake shoes may be accomplished without disconnecting any portion of the automatic adjuster mechanism.

Another important object of our invention is to provide an automatic slack adjuster wherein the basic adjustment mechanism is almost identical to existing manual adjusters, and which only a few additional parts are added thereto to effect automatic adjustment.

DETAILED DESCRIPTION

Figure 1:
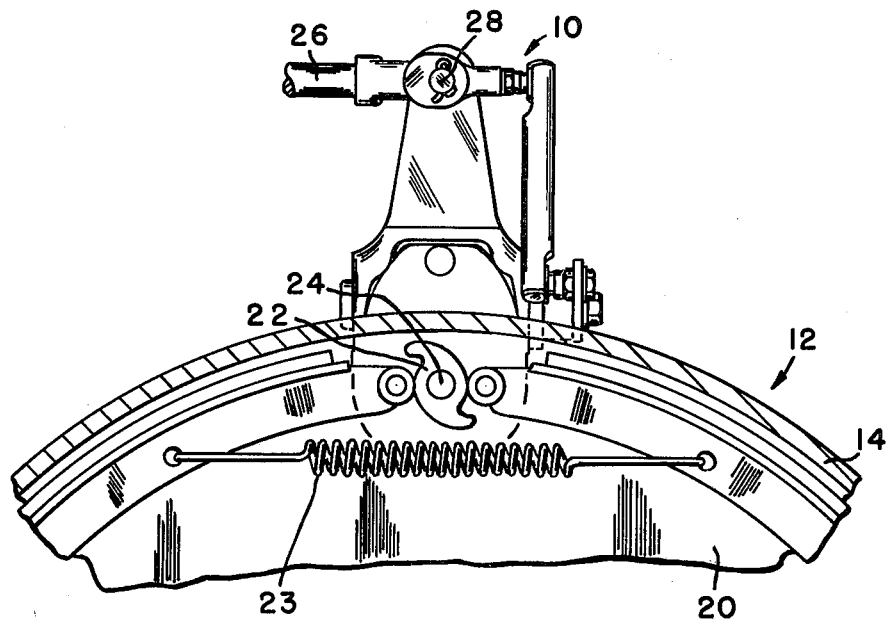
FIG. 1 is a fragmentary plan view, partly in section, of a cam actuated brake having an actuator incorporating the automatic adjustment feature of our invention.

Referring now to FIG. 1, a brake actuator generally indicated by the numeral 10 is illustrated which controls actuation of an S-cam type of drum brake generally indicated by the numeral 12. The brake 12 includes a drum 14 which is mounted for rotation with a member to be braked. A pair of brake shoes 16, 18 are pivotally mounted on a stationary backing plate 20 for movement toward and away from the drum 14. A cam actuator 22 is rigidly mounted on a drive or cam shaft 24 which extends through the backing plate 20 between contiguous ends of the brake shoes 16 and 18. A brake shoe return spring 23 maintains the ends of the brake shoes 16 and 18 in contact with the cam actuator 22. The actuator 10 is also mounted on the cam shaft 24. A thrust rod 26 is pivotally connected to the actuator 10 by the pivot 28, and is also connected to a conventional fluid pressure actuator (not shown). When fluid pressure is admitted to the aforementioned fluid pressure actuator, the thrust rod 26 is urged to the right viewing FIG. 1, thereby pivoting the actuator 10 in a clockwise direction. Movement of the actuator 10 rotates the cam shaft 24 to rotate the cam 22, which thrusts the brake shoes 16 and 18 against the drum 14 to thereby effect a brake actuation. When the brakes are released, the fluid pressure actuator is evacuated, and the return spring therein acts with the brake shoe return spring 23 to urge the actuator 10 in a counter-clockwise direction to return the cam 22 to the position illustrated in the drawing.

Figure 2:
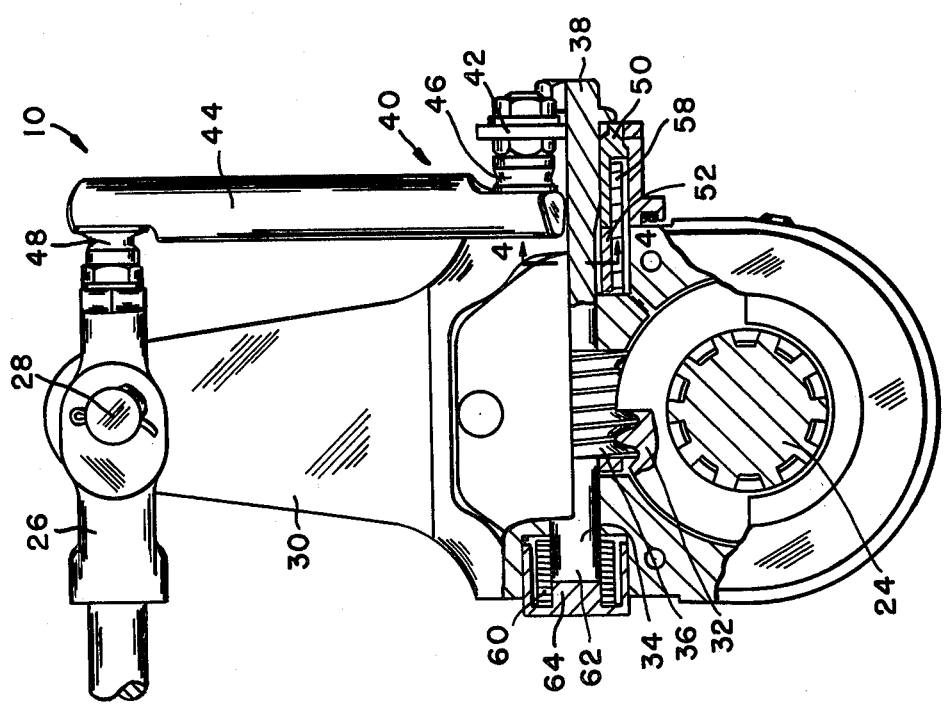
FIG. 2 is a side elevational view, partly in section, of the brake actuator with automatic adjustment mechanism illustrated in FIG. 1.

The actuator 10 includes a lever housing 30 which mounts a gear 32 which is splined for rotation with the cam shaft 24. As can be seen in FIG. 2, rotation of the gear 32 will result in corresponding rotation of the cam shaft 24 relative to the housing 30. It should be remembered, of course, that in a normal brake application when adjustment is not necessary, the cam shaft 24 does not rotate relative to the housing 30, but instead the housing 30 rotates the cam shaft 24 to actuate the cam 22. An adjustment shaft 34 is rotatably mounted within the housing and extends substantially perpendicular to the cam shaft 24. A worm gear 36 is rigidly mounted on the adjustment shaft 34 for rotation therewith and is meshed with the gear 32 so that upon rotation of the adjustment shaft 34 in the clockwise direction the cam shaft 24 will also be rotated relative to the housing 30 in a clockwise direction, thereby advancing the cam 22 to effect adjustment of the brakes by bringing the brake shoes 16 and 18 closer to the drum 14. The end 38 of the adjustment shaft 34 extends from the housing 30 and is provided with a hex nut or other appropriate fitting which is adapted to receive an appropriate wrench or other tool so that manual adjustment of the brakes may be effected.

Figure 4:
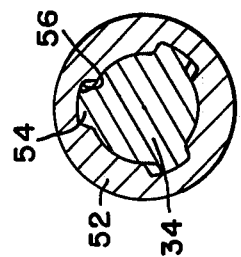
FIG. 4 is a cross-sectional view taken along line 4—4 of FIG. 2.

The brake actuator 10 is equipped with automatic adjustment mechanism generally indicated by the numeral 40. A crank arm 42 is rotatably mounted on the portion of the adjustment shaft 34 which extends from the housing 30; however, the adjustment shaft 34 may be rotated relative to the crank arm 42 without disconnecting the latter when a manual brake adjustment must be effected. A connecting rod 44 is connected by a pivot 46 to the one end of the crank arm 42 and is also connected to the end of the thrust rod 26 by pivot mechanism 48. A crank sleeve 50 is rotatably mounted on the adjustment shaft 34 and is integral with the crank arm 42. A drive sleeve 52 is also mounted on the adjustment shaft 34 coaxial with the crank sleeve 50 and is connected to the adjustment shaft 34 by splines 54 on adjustment shaft 34, which are received in corresponding grooves 56 in the drive sleeve 52. As can best be seen in FIG. 4, the slots 56 are wider than are the splines 54 so that the sleeve 52 may be rotated relative to the adjustment shaft 34 for a predetermined arc, until the edges of the splines 54 contact the corresponding edges of the grooves 56. Therefore, a lost motion connection is provided between the drive sleeve 52 and the adjustment shaft 34. The sleeves 50 and 52 are encircled by a clutch spring 58 which is more clearly shown in FIG. 5.

Figure 5:
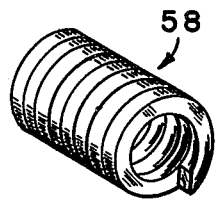
FIG. 5 is a perspective view of one type of clutch spring which is used in the brake actuator comprising our invention.

As can be seen in FIG. 5, the clutch spring 58 is a simple coiled spring which is wound left hand. In other words, if one end of the sleeve spring 58 is held stationary while a clockwise torque is applied to the other end of the spring 58, the diameter of the spring 58 shrinks. Conversely, if a counterclockwise torque is applied to one end of the spring while the other end is held stationary, the diameter of the spring increases in size. As is illustrated in FIG. 2, the clutch spring 58 encircles the crank sleeve 50 and the drive sleeve 52. However, the diameters of the sleeves 50, 52 are slightly greater than the relaxed diameter of the clutch spring 58 so that a frictional interference fit is established between the spring 58 and the sleeves 50 and 52. Furthermore, the diameter of sleeve 50 is slightly greater than the diameter of the sleeve 52 so that the frictional interference fit between the coil spring 58 and the sleeve 50 generates a greater force than does the frictional interference fit of the spring 58 against the drive sleeve 52. Therefore, when the crank sleeve 50 is torqued, the clutch spring 58 will slip on the sleeve 52 at a lower torque level than the torque level at which it will slip on the crank sleeve 50.

Figure 6:
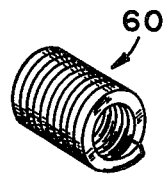
FIG. 6 is a perspective view of another type of clutch spring which is used in our invention.

A second clutch spring 60 encircles the end 62 of the adjustment shaft 34 and a boss 64 which is provided on the housing 30. The clutch spring 60 is wound right handed; that is, it is wound opposite to the windings of the spring 58. Therefore, when one end of the spring 60 is held against rotation while the other end of the spring 60 is torqued in a clockwise direction, the diameter of the spring 60 will tend to increase, which may be most easily understood by studying FIG. 6. Conversely, when one end of spring 60 is held stationary while the opposite end is torqued in a counterclockwise direction, the diameter of the spring 60 decreases.

MODE OF OPERATION

Figure 3:
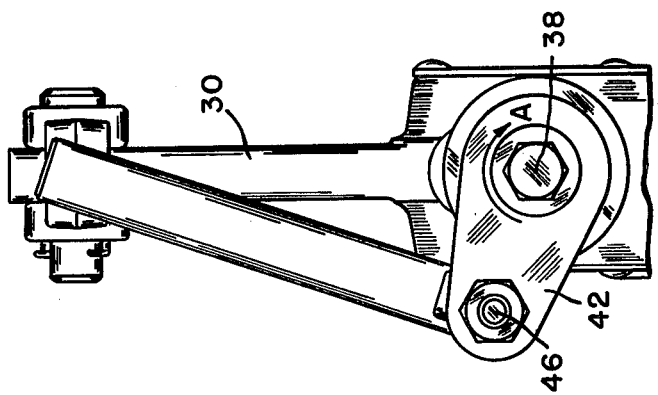
FIG. 3 is a fragmentary end elevational view of the brake adjuster illustrated in FIG. 2.

When a brake actuation is effected, fluid pressure is communicated to the aforementioned fluid pressure actuator (not shown) which urges the thrust rod 26 to the right viewing the Figures. Movement of the thrust rod 26 to the right rotates the actuator 10, rotating the cam shaft 24 to turn the cam 22 to thereby effect a brake actuation. Since the orientation of the thrust rod 26 is fixed by the pivot 28 and by the fluid motor, the effective distance between the crank arm 42 and the thrust end of the thrust rod 26 increases as the actuator 10 is pivoted. However, since the connecting rod 44 interconnects the thrust rod 26 and the crank arm 42, the latter will be rotated about the adjustment shaft 34 in the direction of the arrow A in FIG. 3. Rotation of the crank arm 42 also rotates the crank sleeve 50 since the crank sleeve and crank arm are integral with one another. As discussed hereinabove, a frictional interference fit exists between the clutch spring 58 and the crank sleeve 50 and drive sleeve 52. Therefore, rotation of the crank sleeve 50 will be transmitted to the drive sleeve 52. If a brake adjustment is not necessary, the shoes 16 and 18 will frictionally engage the drum 14 before or at the time that the drive sleeve 52 has rotated sufficiently to bring the splines 54 into engagement with the edges of the grooves 56 so that the adjustment shaft 34 is not rotated. However, if wear of the friction elements 16, 18 has increased the running clearance between the latter and the drum 14 an amount sufficient to require a brake adjustment, the edges of the grooves 56 will come into contact with the splines 54. Furthermore, since the spring 58 is wound left hand and a clockwise torque is applied to the right hand end of the latter by the crank sleeve 50, the diameter of the spring 58 tends to shrink, thereby increasing the force of the frictional interference fit between the spring 58 and the sleeves 50 and 52, thereby causing the spring to more tightly grip the sleeves 50 and 52. Therefore, the additional rotation of the drive sleeve 52 is transmitted to the adjustment shaft 34, which rotates the latter. Since the spring 60 is wound right hand, and a clockwise torque is exerted on the right hand end of the latter while the left hand end of the latter is held stationary by boss 64, the diameter of the spring 60 tends to increase, thereby reducing the frictional force fit between the spring and the shaft 34, to permit the latter to more freely rotate. Rotation of the adjustment shaft 34 is transmitted to the cam shaft 24 through the gears 32 and 36 so that the cam shaft 24 is rotated relative to the housing 30 to thereby also rotate the cam 22 to effect a brake adjustment, it being remembered that the stroke of the aforementioned fluid motor, and therefore the return movement of the actuator 10, is limited to substantially a predetermined distance. Despite the fact that clockwise torquing of the clutch spring 58 during brake application reduces the diameter of the clutch spring 58 and consequently increases the force of the frictional interference fit between the spring 58 and the sleeves 50 and 52, at some relatively high force level the spring 58 will slip on the outer circumferential surface of the sleeve 52 during a brake actuation. Consequently, operation of the adjustment mechanism 40 is limited to the predetermined high force level required to generate a torque sufficient to cause the spring 58 to slip on the sleeve 52. It will also be noted that the running clearance between the brake shoes 16, 18 and drum 14 is governed by the lost motion connection between the drive sleeve 52 and the adjustment shaft 34. Consequently, the running clearance permitted by the adjustment automatic adjuster may be designed by selecting the proper width of the grooves 56 relative to the splines 54.

When the brakes are released after a brake adjustment has been effected by the automatic adjuster mechanism 40, the thrust rod 26 is urged to the left, viewing the Figures, thereby rotating the crank arm 42 and the crank sleeve 50 integral therewith in a counterclockwise direction about the adjustment shaft 34. Since this movement applies a counter-clockwise torque to the clutch spring 58, the diameter of the latter tends to increase in size, thereby reducing the strength of the force of the frictional interference fit between the clutch spring 58 and the sleeves 50 and 52. However, since the diameter of sleeve 50 is larger than the diameter of the sleeve 52, the spring 58 will remain frictionally engaged with the crank sleeve 50 during counterclockwise rotation of the latter, but due to the reduced strength of the force fit between the clutch spring 58 and the drive sleeve 52, the clutch spring 58 will slip on the outer diameter of the drive sleeve 52, thereby permitting the crank arm 42 to return to position illustrated in the drawings without rotating the adjustment shaft 34 after a brake application is effected. The adjustment shaft is further prevented from rotating in the counterclockwise direction by the spring 60. During attempted counterclockwise movement of the adjustment shaft 34, the right hand wound clutch spring 60 is being torqued in a counterclockwise direction, the diameter of the spring 60 tends to decrease, thereby more tightly gripping the adjustment shaft 34 to prevent the latter from rotating.

Although the automatic adjuster mechanism 40 operates well under nearly all braking conditions, there are situations where the brake shoes must be backed away from the drum. This can be quite easily accomplished with the adjuster made pursuant to the teachings of our invention since the vehicle operator need only apply the appropriate tool to the end 38 of the adjustment shaft 34 which extends from the housing 30, and then rotate the shaft 38 in the counterclockwise direction, which will permit the brake shoes to move away from the drum. Of course, the vehicle operator must overcome the frictional restraining forces exerted by the spring 60 against the end 62 of the adjustment shaft 34, but once this torque level is overcome, the adjustment shaft 34 will slip relative to the spring 60, thereby permitting the brake shoes to be backed off. Of course, a manual adjustment may also be effected to bring the brake shoes closer to the drum 14 by manually turning the adjustment shaft 34 in the clockwise direction.

We claim:

1. In an actuator for a brake:
a drive shaft for actuating said brake;
a lever including a housing mounted on said drive shaft for actuating said drive shaft;
said lever being movable in brake actuation and brake release directions;
an adjustment shaft rotatably mounted within said housing and drivingly interconnected with said drive shaft to rotate the latter relative to said housing in a direction to effect brake adjustment when the adjustment shaft is rotated in a brake adjustment effecting direction, said adjustment shaft rotating said drive shaft in the opposite direction to back off said brake when the adjustment shaft is rotated in the opposite direction;
means on said adjustment shaft accessible from the exterior of said housing for manually effecting rotation of said adjustment shaft in either direction; and
automatic adjustment means connected with said adjustment shaft for rotating the latter in said brake adjustment effecting direction only upon movement of said lever in the brake actuation direction when the stroke of the lever exceeds a predetermined amount;
said automatic adjustment means including clutch means releasably connecting said automatic adjustment means for rotation of said shaft, said clutch means disconnecting said adjustment shaft and said automatic adjustment means when manual rotation of said adjustment shaft in either direction is effected.

2. The invention of claim 1:
said adjustment means including a crank sleeve rotatably mounted on said adjustment shaft, means for rotating said crank sleeve in a brake adjustment effecting direction as the lever is moved in the brake actuating direction, a drive sleeve drivingly connected with said adjustment shaft, said clutch means interconnecting said sleeves but permitting relative rotation between the adjustment shaft and the crank sleeve when the torque applied to the clutch means exceeds a predetermined amount.

3. The invention of claim 2:
said clutch means transmitting a predetermined torque level before permitting relative rotation between the adjustment shaft and the crank sleeve when the latter is rotated in the brake adjustment effecting direction and permitting relative rotation between the adjustment shaft and the crank sleeve when the latter is rotated in the opposite direction.

4. The invention of claim 3; and
second clutch means engaging said adjustment shaft permitting rotation of the latter in said brake adjustment effecting direction but impeding rotation of the adjustment shaft in the opposite direction.

5. In an actuator for a brake:
a drive shaft for actuating said brake;
a lever including a housing mounted on said drive shaft for actuating the latter, said lever being movable in brake actuation and brake release directions;
an adjustment shaft member rotatably mounted within said housing and drivingly interconnected with said drive shaft to rotate said drive shaft relative to said housing in a direction to effect brake adjustment; and
automatic adjustment means operably connected with said adjustment shaft member for rotating the latter in said direction effecting brake adjustment upon movement of the lever in the brake actuating direction when the stroke of the lever exceeds a predetermined amount;
said automatic adjustment means including crank means, means for rotating said crank means in a brake adjustment effecting direction as the lever is moved in the brake actuating direction, a drive member drivingly connected with the adjustment shaft, and clutch means coupling said drive member with said crank means when the latter is rotated in said brake adjustment effecting direction but uncoupling the crank means and the drive member when the crank means is rotated in the opposite direction;
said crank means including a crank sleeve rotatably mounted on said adjustment shaft, said drive means including a drive sleeve operably connected with said adjustment shaft, said clutch means including an actuation coil spring, said sleeves being received in opposite ends of said actuation coil spring, the diameters of said sleeves being greater than the relaxed diameter of the actuation coil springs to create an interference fit between the spring and the sleeves so that the actuation spring grippingly engages the sleeves, the diameter of said crank sleeve being greater than the diameter of said drive sleeve so that the strength of the interference fit between the actuation spring and the crank sleeve is greater than the strength of the interference fit between the actuation spring and the drive sleeve.

6. The invention of claim 5; and
a lost motion connection between said drive member and said adjustment shaft member to permit a predetermined amount of relative rotation between the drive means and the adjustment shaft before adjustment is effected.

7. The invention of claim 6:
said lost motion connection including axially extending splines on one of said members and mating grooves on the other member receiving said splines, the width of said splines being less than the width of the grooves to permit relative rotation between the members until the splines engage the sides of the groove.

8. The invention of claim 5:
said actuation coil spring being wound so that when the spring is torqued by rotation of the crank means in the brake adjustment effecting direction the diameter of the actuation spring decreases to thereby increase the strength of the interference fit between sleeves and the spring, the diameter of the actuation spring increasing as the latter is torqued by rotation of the crank in the opposite direction, whereby the actuation spring slips on said drive sleeve.

9. The invention of claim 8; and
an antireverse coil spring wound opposite to the actuation coil spring and receiving one end of said adjustment shaft, whereby upon rotation of the latter in said brake adjustment effecting direction the diameter of said antireverse spring increases to permit rotation of the shaft relative to the antireverse coil spring, and when rotation of the adjustment shaft in the opposite direction is attempted the diameter of the antireverse spring decreases to grippingly engage the adjustment shaft to prevent rotation of the latter in said opposite direction.

10. In an actuator for a brake:
a drive shaft for actuating said brake;
a lever including a housing mounted on said drive shaft for actuating the latter, said lever being movable in brake actuation and brake release directions;
an adjustment shaft rotatably mounted within said housing and drivingly interconnected with said drive shaft to rotate said drive shaft relative to said housing in a direction to effect brake adjustment when the adjustment shaft is rotated in the brake adjustment effecting direction;
automatic adjustment means operably connected with said adjustment shaft for rotating the latter in said direction effecting brake adjustment upon movement of the lever in the brake actuating direction when the stroke of the lever exceeds a predetermined amount;
said automatic adjustment means including means rotatable in a brake adjustment effecting direction when the lever is moved in the brake actuating direction and in the opposite direction as the lever is moved in the release direction, first clutch means drivingly connecting the adjustment shaft with said rotatable means when the latter is rotated in said brake adjustment effecting direction but permitting the rotatable means to rotate relative to the adjustment shaft when the rotatable means is rotated in the opposite direction, and second clutch means permitting said automatic adjustment means to rotate said adjustment shaft in said brake adjustment effecting direction but grippingly engaging said adjustment shaft to prevent rotation of the latter when the rotatable means is rotated in said opposite direction.

11. The invention of claim 10:
said automatic adjustment means including crank means rotatable relative to said adjustment shaft means for rotating said crank means in a brake adjustment effecting direction as said lever is moved in the brake actuating direction, drive means drivingly connected to said adjustment shaft, said first clutch means being a coiled spring interconnecting the drive means and the crank means, said coiled spring being wound so that the spring slips relative to the drive means at a predetermined torque level when the crank means is rotated in the brake adjustment effecting direction and permits relative rotation between the drive means and the crank means when the crank means is rotated in the opposite direction.

12. The invention of claim 11:
said second clutch means being a second coiled spring wound opposite from the clutch spring comprising said first clutch means, said second coiled spring engaging said adjustment shaft to permit the latter to rotate in said brake adjustment effecting direction, but impeding rotation of said adjustment shaft in the reverse direction.

* * * * *

UNITED STATES PATENT OFFICE
CERTIFICATE OF CORRECTION

Patent No. 3,901,357     Dated August 26, 1975

Inventor(s) Richard J. Reitz; John M. Nicolson; and Guenter K. Herold

It is certified that error appears in the above-identified patent and that said Letters Patent are hereby corrected as shown below:

Add: References Cited
    UNITED STATES PATENTS
    3,507,369   12/1967   Oliver.......188--196

Signed and Sealed this sixteenth Day of December 1975

[SEAL]

Attest:

RUTH C. MASON
*Attesting Officer*

C. MARSHALL DANN
*Commissioner of Patents and Trademarks*